(12) United States Patent
Verger et al.

(10) Patent No.: US 9,568,659 B2
(45) Date of Patent: Feb. 14, 2017

(54) LUMINOUS GLAZING UNIT

(71) Applicant: SAINT-GOBAIN GLASS FRANCE, Courbevoie (FR)

(72) Inventors: Arnaud Verger, Paris (FR); François-Julien Vermersch, Paris (FR); Samuel Solarski, La Madeleine (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/413,968

(22) PCT Filed: Jul. 1, 2013

(86) PCT No.: PCT/FR2013/051539
§ 371 (c)(1),
(2) Date: Jan. 9, 2015

(87) PCT Pub. No.: WO2014/009630
PCT Pub. Date: Jan. 16, 2014

(65) Prior Publication Data
US 2015/0253486 A1 Sep. 10, 2015

(30) Foreign Application Priority Data
Jul. 11, 2012 (FR) ..................................... 12 56664

(51) Int. Cl.
*F21V 8/00* (2006.01)
*B60Q 3/02* (2006.01)
(Continued)

(52) U.S. Cl.
CPC ....... *G02B 6/0035* (2013.01); *B32B 17/10036* (2013.01); *B32B 17/10247* (2013.01);
(Continued)

(58) Field of Classification Search
CPC .................. B32B 17/10036; B32B 17/10761; G02B 6/006
See application file for complete search history.

(56) References Cited

U.S. PATENT DOCUMENTS

| | | | |
|---|---|---|---|
| 2002/0167820 A1* | 11/2002 | Haering | ................. B60Q 3/004 362/551 |
| 2007/0098969 A1* | 5/2007 | Ansems | ............ B32B 17/10036 428/212 |
| 2011/0267833 A1 | 11/2011 | Verrat-Debailleul et al. | |

FOREIGN PATENT DOCUMENTS

| | | |
|---|---|---|
| DE | 101 23 263 A1 | 11/2002 |
| FR | 2 809 496 A1 | 11/2001 |

(Continued)

OTHER PUBLICATIONS

International Search Report issued in International Patent Application No. PCT/FR213/051539, dated Sep. 27, 2013.

(Continued)

*Primary Examiner* — Elmito Breval
(74) *Attorney, Agent, or Firm* — Pillsbury Winthrop Shaw Pittman LLP (57) ABSTRACT

A luminous glazing unit includes at least two glazing elements, for example at least two transparent glass sheets; optionally at least one lamination interlayer between the two glazing elements; at least one waveguide element, located on one face of the lamination interlayer and/or between the two glazing elements, the waveguide element having a refractive index higher than the refractive index of the adjacent interlayer and/or glazing elements; at least one light source, for example positioned at the edge of the glazing unit in order to illuminate the waveguide element via the edge face of the latter; and at least one light extraction device, formed by at least one fibrous structure, this structure being (Continued)

in the form of at least one textile, this structure or this extraction device being placed in the core of the waveguide element.

23 Claims, 1 Drawing Sheet (51) Int. Cl.
*B60Q 3/00* (2006.01)
*B32B 17/10* (2006.01)
*B60Q 1/26* (2006.01)

(52) U.S. Cl.
CPC .. *B32B 17/10541* (2013.01); *B32B 17/10761* (2013.01); *B60Q 3/002* (2013.01); *B60Q 3/004* (2013.01); *B60Q 3/0203* (2013.01); *G02B 6/006* (2013.01); *G02B 6/0065* (2013.01); *G02B 6/0095* (2013.01); *B60Q 1/268* (2013.01); *B60Q 3/0213* (2013.01)

(56) References Cited

FOREIGN PATENT DOCUMENTS

| | | |
|---|---|---|
| WO | 01/79644 A1 | 10/2001 |
| WO | 2004/025334 A2 | 3/2004 |
| WO | 2005/054915 A1 | 6/2005 |
| WO | 2010/049638 A1 | 5/2010 |
| WO | 2012/098330 A1 | 7/2012 |
| WO | 2013/068678 A1 | 5/2013 |

* cited by examiner

LUMINOUS GLAZING UNIT

CROSS-REFERENCE TO RELATED APPLICATIONS

This application is the U.S. National Stage of PCT/FR2013/051539, filed Jul. 1, 2013, which in turn claims priority to French Application No. 1256664, filed Jul. 11, 2012. The contents of all of these applications are incorporated herein by reference in their entirety.

The present invention relates to a luminous (or "illuminating") glazing unit, mainly intended to be used in an architectural application or in any planar lamp or area lamp application, though it may also be used in an automotive application if required. In particular it relates to a glazing unit illuminated via its edge face, especially one illuminated using light-emitting diodes.

Light-emitting diodes (LEDs) were originally used in flashlights or as indicator lights for electronic and electrical appliances, and have for a number of years been employed as the light source(s) in automotive vehicle signaling devices (signaling lights, etc.), indicators or positioning lights, in portable lamps or in path lighting. Diodes have a number of advantages, namely their long lifetime, their luminous efficiency, their reliability, their low power consumption and their small size, meaning that units employing them are more reliable and require less maintenance.

More recently, light-emitting diodes have been used in illuminating glazing units in architectural or automotive applications. In the latter field, for example, panoramic roofs illuminated by light-emitting diodes are known, as described in document WO 2010/049638. The light emitted by the diodes is introduced into the glazing unit, into part of its thickness forming a waveguide, via one or more of its lateral sides forming an edge face, the light being extracted from the glazing unit via one and/or other of its main faces ("luminous" face(s)). The waveguide part generally takes the form of a thin sheet made of a transparent material, and extraction via one face or surface of the glazing unit is achieved by creating an extraction area on one face or in the thickness of the wave guide.

This extraction area is generally produced by sandblasting, etching or acid erosion, or by coating with an enamel scattering layer deposited by screen printing, as described in document FR 2 809 496.

Nevertheless, in the architectural field or in the automotive field, each of these various methods has its limits, which, depending on the circumstances, make them somewhat incompatible with certain products or requirements.

In particular, sandblasting, etching or acid erosion are, in general, only suitable for treating small areas and/or require long treatment times incompatible with industrial batch production or mass production lines, or may even weaken the glass used. Although enameling, on the one hand, allows a uniform lighting effect to be obtained, it, on the other hand, poses problems regarding adhesion and degradation of the enamel layer when it is placed on an external face, and the enamel may prove to be incompatible or interfere with certain required functions, in particular posing problems for film-comprising glazing units.

Furthermore, some of the light introduced into the glazing unit via its side is generally absorbed by the glass, thus the brightness of the illumination obtained may vary from point to point over the substrate as a function of distance from the light sources.

Therefore, by way of the present invention it has been sought to develop a novel luminous or illuminating glazing unit, in particular one using light-emitting diodes, more adapted to the architectural field and especially to planar lamps, in particular a glazing unit that is effective in terms of light extraction without however having the drawbacks or incompatibilities seen above, this glazing unit being simple, providing illumination of uniform brightness and having an attractive appearance, if required in targeted zones, this glazing unit being compatible with the requirements of industry (ease and rapidity of production, reliability, etc.) and advantageously increasing the range of possible applications.

This aim is achieved by the (laminated) glazing unit according to the invention, which glazing unit comprises:
- at least two glazing (inorganic or organic glass) elements, in particular at least two transparent glass sheets;
- optionally at least one lamination interlayer (generally made of an organic material) between the two glazing elements;
- at least one waveguide element, in particular located on one face of the lamination interlayer and/or between the two glazing elements, said waveguide element (which is advantageously made of an organic material) having a refractive index higher than the refractive index of the adjacent (interlayer(s) and/or glazing(s)) elements (i.e. the elements in contact with its main faces);
- at least one (in particular in the visible and/or ultraviolet) light source, in particular positioned at the edge of the glazing unit in order to illuminate the waveguide element via the edge face of the latter; and
- at least one light extraction means, formed by at least one fibrous structure (or at least one fibrous structure as an extraction means), this structure (formed of fibers) advantageously being in the form (or taking the form) of at least one textile (or at least one textile layer or web), this structure (or extraction means) being placed (or positioned) in (or incorporated into) the core of the waveguide element.

The expression "placed in the core of the waveguide element" is understood to mean that the fibrous structure is located (essentially, i.e. at least 90% or even 100% in volume) in the thickness of the waveguide element (as opposed to (essentially) on the surface of one or other of its main faces) or between two (lateral edges of two) waveguide elements (or waveguide elements parts), or even is located essentially on the edge face (i.e. on at least one of its lateral edges) of the waveguide element (the waveguide element ending up at said extraction means), in particular on a part opposite the side or one of the sides receiving the one or more sources. In particular, the fibrous structure advantageously does not go beyond of the thickness of the waveguide element (it especially has a thickness smaller than or equal to that of the waveguide element).

The expression "main faces" is understood to mean the faces that are largest in size (in contrast to the edge face).

The term "textile" is understood to mean at least one two-dimensional structure formed from fibers (and/or threads), i.e. having fibers running in at least two different directions, in particular intertwining or intermixed/intermingled fibers, especially in the form of at least one network of intersecting/intertwining fibers or in the form of web(s) or mat(s) or veil(s) of continuous or discontinuous (cut) fibers placed, when appropriate, randomly and optionally secured together by needling or adhesive bonding possibly (nonwoven structures), or in the form of woven(s) or knitted structure(s) (interlaced threads).

The combined use of a waveguide having a refractive index higher than that of the adjacent sheets (especially ensuring transmission, by internal reflection, of the light emitted by the one or more sources, thereby minimizing loss of light, via scattering into the adjacent layers, until the extraction area is reached) and of the fibrous structure (in particular formed from at least one textile layer or web) as an extraction means, and the particular position of said fibrous layer in the body of the waveguide, allow a particularly effective and attractive luminous or illuminating glazing unit to be obtained. In addition to the "fibrous" illumination thus obtained (variable depending on the transparency of the layers between the fibrous structure and the external face on which the one or more luminous patterns are displayed, and depending, where appropriate, on the refractive index difference between the fibrous structure and its encapsulation medium), positioning the textile in this way does not adversely affect the adhesion of the other layers on either side of the waveguide (in contrast to the case where it is located on the surface of the waveguide, there being a risk in the latter case of a safety glazing unit losing its safety characteristics) and it is more easily incorporated into the waveguide (which is advantageously made of an organic material, it being much simpler to incorporate the fibrous material into such a plastic material and then laminate the assembly between two sheets of glass, and to bend them all, than to deposit the fibrous material on a glass sheet and to bend the assembly since there is a risk of the fibrous material moving in the latter case). The glazing unit according to the invention is particularly effective while being simple to produce and hard-wearing.

The glazing unit according to the invention generally has an edge face, two main faces and a given thickness. It is formed by a plurality of (laminated) sheets including at least one part forming a waveguide for guiding (generally by internal reflection, in particular total internal reflection, through the thickness of said part) the light emitted by the one or more light sources (radiation sources), according to the present invention.

The glazing unit may be planar but may also be bent or curved (especially in the case of an automotive glazing unit). It may be parallelepipedal, comprising sheets or main faces that are rectangular, or square or even any other shape (circular, oval, polygonal, etc.). It may be of various sizes, and it may especially be large, for example having an area greater than 0.5 or 1 m$^2$. It is generally at least 0.7 mm and especially at least 1 mm in thickness, in particular being between 2 and 20 mm in thickness, and for example between 3 and 5 mm in thickness, the part forming the waveguide generally being at least 0.3 mm in thickness and in particular between 0.7 and 3 mm in thickness, and in addition no greater than 20 mm in thickness.

The substrate (likewise the waveguide) is advantageously formed from transparent elements (films, panes, sheets, layers, etc.) or materials (especially vitreous, mineral or organic materials) that are clear or tinted and possibly joined together, where appropriate, by hot or cold bonding, especially by laminating (a laminated unit or laminated glazing unit being spoken of) or adhesive bonding, etc. The term "transparent" (or (semi)transparent) is understood to mean a light transmission $T_L$ of at least 3%, in particular of at least 40% or 50% (especially for the internal sheets or films of the glazing unit, in particular the lamination interlayers or the waveguide, or for the external sheet via which the light is intended to exit) at least in the (useful) wavelength ranges between 400 nm and 800 nm, the light transmission being measured (in a known way, in particular according to standard ISO 9050:2003) under illuminant D65.

Generally, the (at least two) glazing elements of the glazing unit are sheets (or panes) made of mineral glass (of about 0.7 to 6 mm or more in thickness), mineral glass having multiple advantages, in particular a good heat resistance (it may thus be placed near light sources, for example diodes, despite the fact that they get hot; it also meets the requirements of fire safety standards) and a good strength (it is thus easy to clean and scratch resistant). This mineral glass may (depending on the appearance and the optical effect desired and on the application of the glazing unit, etc.) be a clear glass (light transmission $T_L$ of 90% or more for a thickness of 4 mm), for example a standard soda-lime glass such as Planilux® from Saint-Gobain Glass, or an extra-clear glass ($T_L$ of 91.5% or more), for example a soda-lime-silica glass containing less than 0.05% Fe III or $Fe_2O_3$, such as Diamant® glass from Saint-Gobain Glass or Optiwhite® glass from Pilkington or B270° glass from Schott, or have one of the other compositions described in document WO 04/025334. The glass may also be darkened, and may even be a neutral color (colorless), or (slightly) tinted or colored (Venus or TSA glass from Saint-Gobain Glass, etc.); it may be smooth or textured (Albarino® glass from Saint-Gobain Glass, etc.) and may have undergone a chemical or heat treatment such as a toughening, annealing, tempering (especially in order to increase its strength) or bending treatment; it is generally obtained by a float process. It may also, if required, be a glass ceramic, preferably a low-opacity glass ceramic, in particular a clear glass ceramic, for example the glass ceramic KeraLite from Eurokera. In the present description, unless specified otherwise, the term "glass" is understood hereinbelow to mean a mineral glass.

Apart from (or optionally alternatively to) the aforementioned mineral glass elements, the substrate may also contain elements based on organic materials, for example made of transparent plastic, for example polycarbonate (PC), polyvinyl butyral (PVB), polyolefins such as polyethylene or polypropylene, polyethylene terephthalate, polyurethane (PU), acrylic polymers such as polymethyl methacrylate (PMMA), polytetrafluoroethylene (PTFE), ethylene-tetra-fluoroethylene (ETFE), ionomer resin, copolymer resin, etc. If required, the glazing unit could essentially be made of plastic (organic sheet(s)) to decrease bulk and/or weight, or to allow a greater range of shapes to be produced, however it generally comprises at least two mineral glass sheets as indicated above.

As indicated in the definition of the invention, the glazing unit may especially comprise at least one advantageously transparent lamination interlayer (or element or film) advantageously made of an organic material (for example a plastic film chosen from the aforementioned materials, for example made of PVB or (flexible) PU or of a plasticizer-free thermoplastic (ethylene vinyl acetate (EVA) copolymer, etc.), between the (at least two) glazing elements, the various (organic or mineral glazing) elements or layers of the glazing unit forming a laminated unit (or even optionally a multiple glazing unit if, for example, the assembly is associated with another layer separated by an air-filled cavity). If required, the glazing unit comprises at least two of said interlayers, between which the waveguide element is located. Each interlayer is, for example, between 0.2 mm and 1.1 mm in thickness and especially between 0.38 and 0.76 mm in thickness.

By way of example, the glazing unit may be (or comprise) a laminated unit formed (in order) by a first transparent mineral, or optionally organic, glass sheet, an organic interlayer (for example made of transparent PVB, whether tinted or not), a waveguide element (formed from one or more, in particular planar, parts or sections, as described below) incorporating (inside one part or at the intersection of two parts) at least one fibrous layer, optionally another organic interlayer, and a second mineral, or organic, glass sheet, the sheet placed on the side provided for light extraction preferably being a clear glass sheet, the other sheet and/or the one or more interlayers possibly being clear and/or darker or tinted and/or incorporating a decorative and/or functional film as indicated below (for example a low-E film, etc.), especially for preventing the escape of solar heat.

In the optional case of a multiple glazing unit (for example a glazing unit for a train), the glazing unit has an internal space that is under vacuum or filled with a gas (air, noble or inert gas, argon for example, etc.), the internal space being less than 10 mm in height, for example. A spacer, especially located on the periphery of the glazing unit, for example, bounds the internal space, this spacer possibly being a strip, a monolithic strip if required, in particular a frame (especially having a C-shaped, closed, square or rectangular cross section), and if required housing a desiccant; the internal space may moreover be bounded by a peripheral sealing system, for example a seal made of a butyl mastic, as in patent WO01/79644.

According to the invention, the glazing unit comprises at least one (advantageously transparent) waveguide element (made of an organic material), said waveguide element having a refractive index higher than the refractive index of the adjacent (lamination) elements, this element possibly being made up of a number of (especially planar, in the case of a planar glazing unit) parts or sections, each part especially having the function of transmitting light, and being advantageously associated with at least one light source. For example, when a plurality of separate patterns are intended to be illuminated in the glazing unit according to the invention, the waveguide element takes the form of a (continuous) sheet in which fibrous structures are incorporated in each zone to be illuminated, or a plurality of portions (or waveguides) may be provided in a given plane (or optionally in a number of planes) or in the same layer of the laminated unit, each portion being in particular associated with at least one light source and opening onto a fibrous element in a zone to be illuminated (the fibrous element possibly being located at the end of a portion and/or at the intersection of two portions).

The waveguide element is formed from a material having a refractive index higher than the refractive index of the adjacent (lamination) elements. For example, and advantageously (especially in the case where the adjacent elements are one or more glass sheets with refractive indices lower than 1.58 and/or one of more PVB or PU or EVA or PMMA interlayers), a polycarbonate (PC) or polystyrene waveguide with a refractive index of about 1.59 is used (thus, for example, the unit is a glass/PVB/PC/PVB/glass or glass/PMMA/PC/PMMA/glass sandwich). Preferably, the difference between the refractive index of the waveguide and the refractive index of each of the adjacent elements (on each of its main faces) is at least 0.05, and particularly preferably is at least 0.1, or even at least 0.2, the refractive index being measured at 550 nm (this measurement been carried out in a conventional way, especially by spectral ellipsometry).

The guide is advantageously formed from an organic sheet (or plastic sheet), but it could also if required be formed from at least one glass sheet, or even be laminated or a multiple unit, the guide or each of its layers (whether they are organic or mineral or an assembly of both types of layer) advantageously has a refractive index higher than the refractive index of the adjacent elements, its layers also, for example, having similar optical indices (the difference between the indices not exceeding 0.03 in particular). The guide may be thin or thick (especially as large as 20 mm in thickness) and is preferably transparent. It may be tinted, but it is preferably clear or extra-clear. Furthermore, in order to limit loss of the guided light, the guide may for example be made of a glass or an organic material having a linear absorption coefficient lower than 2.5 $m^{-1}$, preferably lower than 0.7 $m^{-1}$, at the wavelength of the guided light. Preferably, the transmission factor (perpendicular to the main faces) of the guide about the transmission peak is 50% or more, especially 70% or more or even 80% or more.

In the absence of a lamination interlayer in addition to the waveguide, the latter (which is advantageously made of an organic material) may, if required, also act as a lamination interlayer (aiding assembly of the mineral glazing elements, if required) between the adjacent glazing elements. Preferably however, the glazing unit according to the invention comprises at least one lamination interlayer, and advantageously at least two lamination interlayers on either side of the guide, in addition to the waveguide and the glazing elements mentioned according to the invention.

As defined according to the invention, the glazing unit also comprises at least one light source (or radiation source) coupled to the guide in order to propagate light (by total internal reflection) inside the waveguide (in its thickness), the source(s) advantageously being associated with or coupled to the edge face of the guide, the extraction means (for extracting the light emitted by the source/the guided light) being located in the thickness of the guide in order to allow at least some of the light to exit via (at least) one of the main faces.

One or more light sources (whether identical or not) may be used, for example electrical light sources and/or light sources consisting of one or more light-emitting devices (LEDs, etc.). The one or more light sources may be monochromatic (emitting in the blue, green, red, etc.) or polychromatic, or be adapted or combined to produce, for example, white light, etc.; they may be continuous or discontinuous, etc.

The light injected into the glazing unit may especially be emitted in the visible and/or UV (preferably in the near UV), the light possibly, in the latter case, being converted into the visible using means for converting UV light into visible light, for example via passage through at least one layer of phosphors associated with the sources or deposited on the edge face or a face (especially the extraction face) of the substrate, at least one source being arranged in order to allow (in combination with the other elements of the glazing unit) illumination of at least one zone of a face (generally a main face) that it is desired to illuminate.

As defined according to the invention, the glazing unit is advantageously a luminous glazing unit illuminated via its edge face, the one or more light sources being placed along the edge face (or edge) of the glazing unit (especially along the edge face of its waveguide part), these one or more sources possibly being a conventional fluorescent tube, a line of relatively closely spaced diodes (LEDs), one or more optical fibers (positioned along the injection edge of the guide with light injection taking place via lateral extraction from the fiber), etc.

The edge face, the corner or the edge of one face of the glazing unit/waveguide may comprise a recess in which the sources or chips are placed (it is for example possible (before tempering) to cut the edge of a sheet in order to lodge diodes therein) and/or the latter may be adhesively bonded, especially to the edge face (an adhesive having a refractive index intermediate between the refractive index of the waveguide and that of the external medium or of the lens, for example, is then chosen). The recessed zone may form a slot along the waveguide, for housing a plurality of sources, the slot being emergent or nonemergent on at least one side in order to facilitate side mounting. The sources may be located in a means for protecting them and/or holding them inside the recessed zone, especially in a U-shaped strip fastened to the coupling edge face by adhesive bonding, by snap-fastening, by bolts, etc. and occupying part or most of the recessed zone.

The edge face may be beveled (angle of at least 45°, in particular of at least 80°, and lower than 90°) in order to redirect the light over a larger extraction zone, and/or the edge face bearing the sources and/or the opposite edge face may be made reflective, for example by virtue of an adhesive metal tape or a silver deposit (protected by a varnish or lacquer against oxidation) or comprise a mirror, to ensure optimal recycling of the guided light.

Advantageously (especially for size, environmental, heating, etc., reasons) quasi-point light sources (such as LEDs) are used, these sources advantageously being placed along the edge face of the guide (in order to inject light into the edge face of the guide), this configuration being simple, economical and effective.

The diodes may be simple semiconductor chips (without encapsulation, collimating lenses), for example being about one hundred microns or one or a few millimeters in size (for example 1 mm in width, 2.8 mm in length and 1.5 mm in height). These chips may also comprise a temporary or permanent protective package for protecting the chip during handling or for improving compatibility between the chip materials and other materials, and/or they may be encapsulated (for example a low-volume SMD (surface mounted device) encapsulation with a package for example made of epoxy or nylon resin or PMMA encapsulating the chip and having various functions: protecting against oxidation and moisture; scattering, focusing or collimating light; wavelength conversion; etc.).

The total number of diodes is defined by the size and location of the zones to be illuminated, by the light intensity desired and by the required illumination uniformity.

The diodes, having, for example, one and/or the other of these features: electrical contacts on opposite faces or on one and the same face, may emit sideways (parallel to the electrical contacts) in a main emission direction perpendicular or oblique to the emitting face of the chip, in order to promote guiding, or emit in two main emission directions that are oblique to the emitting face of the chip, giving a batwing shape, the two directions being, for example, centered on angles between 20° and 40° and between −20° and −40° or on angles between 60° and 85° and between −60° and −85°, or be inverted, or have a Lambertian emission pattern, etc.

The power of each diode is generally below 1 W, especially below 0.5 W. Each diode may be a "high-power" diode (power above 0.2 W) and/or have a luminosity above 5 lumens, and/or it may be preferable to avoid intense spots of light and to choose a batwing diode, for example.

Generally, the diodes are chosen to have the same main emission direction (for greater simplicity), and to have the same monochromatic or polychromatic spectrum (for more uniform illumination). They (each) generally have a main emission direction substantially parallel to the main faces, especially lying as much as +5° or −5° to the extraction face, the glazing unit possibly also comprising at least one reflector for the diodes, arranged in order to redirect the light toward the extraction layer and/or onto the internal or external faces of the glazing unit.

The diodes may be (pre)assembled on one or more backings (printed circuit boards (PCBs)) or supports provided with electrical supply tracks, these backings or supports possibly being fixed to other supports (strips, etc.). Each diode backing/support may lie bordering the glazing unit and be fixed (especially to a glazing sheet and/or the waveguide) by pinch-fitting, interfitting, clip-fastening, screw-fastening, adhesive bonding or double-sided adhesive taping, etc. The backing/support is generally thin, especially being 3 mm, 1 mm or even 0.1 mm or less in thickness, or, if required, thinner than the thickness of a lamination interlayer. Several supports may be provided, especially if the zones to be illuminated are very far apart. The backing may be made of a material which is flexible, dielectric or electrically conductive (metal such as aluminum, etc.), it may be made of a composite, a plastic, etc. The diodes may be soldered to tracks that are electrically insulated from the backing and/or to thermal pads on plastic backings, or an electrically insulating and thermally conductive material (thermal grease, thermally conductive adhesive, tape, single-sided adhesive tape, double-sided adhesive tape, etc.) may be interposed to improve heat dissipation and luminous efficiency and increase the lifetime of the diodes. For one or more diode backings (or supports) of total length L0, the total power of the diode group is preferably 30 [W/m]×L [m] or less in order to limit heating and therefore increase the lifetime of the diodes. To increase luminous efficiency, the backing may also have a (flat or inclined) scattering surface around the diodes, for example a lacquer or coat of paint and/or a white reflector, etc.

The glazing unit may also comprise means for sealing against fluid(s), said means being able to protect the chips, and/or the chip support may be perforated so that the chips can be embedded in an adhesive.

The glazing unit may comprise a number of diode groups (and one or more luminous zones). Identical light sources or light sources emitting various wavelengths may also be associated in various configurations and/or numbers, in order to produce different colors or luminous zones of various shapes.

The glazing unit may also comprise a diode that receives control signals (especially in the infrared), in order to allow the illuminating diodes to be remotely controlled and/or the latter may be coupled to control means allowing different intensities, a given color or various colors, etc. to be emitted permanently or intermittently.

Sources other than diodes may optionally be used, if necessary in a recess provided for this purpose or on an attached element. These other light sources may be, for example, adhesively bonded or laminated to another substrate, especially a transparent (glass, etc.) substrate, using a lamination interlayer, especially an extra-clear lamination interlayer.

For example, a photoluminescent layer which can be excited in the UV (in particular the near-UV, about 360 to 400 nm) or in the visible may be used, especially a substantially transparent photoluminescent layer, preferably combined with a light-emitting device (LEDs, light-emitting layer, etc.) that produces the exciting radiation, for example based on phosphor particles ($CaS:Eu, Tm^{2+}$, $SrAl_2O_4:Eu^{2+}$, $Y_3Al_5O_{12}:Ce$, etc.), optionally combined to produce white light, or core-shell particles (for example ZnS for the shell and CdSe for the core), these particles possibly being suspended in a matrix (for example an inorganic matrix comprising a silicon alkoxide polymerization product such as tetraethoxysilane (TEOS), tetramethoxysilane (TMOS), methyltriethoxysilane (MTEOS), etc.), the photoluminescent layer possibly, if required, converting the wavelength of one or more other sources (for example visible diodes into UV).

Whatever the light source used, the source is advantageously thin, possibly being as little as a few nanometers or especially tens of nanometers in thickness.

In one advantageous embodiment, one or more sensors coupled to the environment and/or to the glazing unit may be associated with the light sources and/or the power supply system of said glazing unit. For example, a light detector (photodiode, etc.) or a temperature sensor (exterior or interior temperature sensor, sensor on the glass or the light sources) may be used, the sensor used for example controlling the power supply of the light sources via a central processing unit. A measurement value may be defined for the sensor (maximum brightness, for example) above which one of the functions of the glazing unit is turned off (especially light extraction or activation of the light sources). For example, for a higher value, the power supply of the glazing unit is turned off, and for a lower value, the glazing unit or one of its functions (for example its brightness level) may be controlled using the information received from the one or more sensors. The user may also "force" operation of the glazing unit by deactivating the sensors.

The sensors may be on the inside (for example, of a vehicle) or on the outside. Controlling the glazing unit as a function of the external environment makes it possible, for example, to increase the lifetime of the light sources and other components (polymers, electronic components, etc.). Limiting the operation of the light sources under bright-light and/or high-temperature conditions makes it possible especially to significantly decrease (by at least between 10 and 20° C.) the maximum temperatures to which they may be exposed during use of the product, while preserving the functions of the luminous glazing unit. This coupling also makes it possible to automatically change the brightness of the illumination provided by the glazing to suit external brightness conditions, without the user having to take any action.

For an automotive glazing unit, the power supply of the light sources may for example be controlled by the central processing unit of the vehicle, allowing or preventing them from being turned on as a function of the information received from the light sensor placed, for example, in the top part of the windshield or on a glazing unit such as a sunroof. At times of high brightness (daytime), the brightness level exceeds the maximum value and the light sources remain off; under low-brightness conditions (nighttime), the maximum value is not reached and the sources are then turned on. Whether the sources are turned on/off may also be controlled by a temperature sensor (on the glazing unit or on the light sources, etc.).

In accordance with the definition of the invention, apart from the various sheets or layers (or elements) forming the base of the glazing unit and the one or more light (or radiation) sources mentioned above, the glazing unit is characterized by the presence of an extraction means in the form of at least one fibrous structure (or "textile"), said extraction means being arranged in order to create a luminous zone on at least one of the faces of the substrate (in particular on the main face), and being located in the core (or heart or body) of the waveguide element (generally beneath the zone to be illuminated). As indicated above, this structure may be located in the waveguide element or intermediate between two (distinct but not necessarily separate) parts of the waveguide element and/or be located on an edge face of one part of the waveguide element.

This fibrous structure preferably comprises glass fibers and/or optionally polymer (or plastic) fibers. The glass used to form the fibers may be any glass that can be made into fibers, especially E-glass. In the case of polymer fibers, they may especially be polyester fibers or fibers made of polyolefin(s) such as polyethylene or polypropylene. The fibers may have the same or different natures, the same or different lengths and the same or different diameters, the density and weight of the structure of the fibers may however vary.

Advantageously, the fibrous structure has a weight per unit area of between 10 and 500 $g/m^2$, preferably between 10 and 100 $g/m^2$, and comprises fibers having a diameter of between 1 and 20 microns, especially between 5 and 15 microns. Preferably, the fibrous structure has a thickness of between 10 microns and 1 millimeter and consists of a layer of fibers or even of a number of layers of fibers.

The fibrous structure preferably has a light transmission $T_L$ higher than 45% and preferably higher than 60%, the light transmission being measured under illuminant D65.

The fibrous structure can be woven or nonwoven or knitted (totally or partly, it is possible for example to weave patterns or form networks of different mesh size), or even embossed (in order to create a 3D effect), the fibers possibly forming a network having hexagonal, square or diamond-shaped meshes, etc. In one advantageous embodiment, the fibrous structure is advantageously a veil (or several identical or different veils, of the same density or not, etc.), thereby ensuring a random distribution of fibers in the extraction layer. Conventionally, the term "veil" is understood to mean a nonwoven formed from completely dispersed filaments. With such a veil, the properties of the layer can be made uniform throughout, especially in terms of light transmission. In addition the veil (more generally the fibrous structure) may be colored, cut into various shapes (it is in particular possible to use a hollow punch to rapidly cut a stack of fibrous structures, etc.), it thus being possible for the extraction area to be continuous or discrete, and for the illuminating patterns to be arranged regularly or randomly from one piece to another.

A nonwoven veil of glass fibers generally contains a binder (possibly incorporating one or more additives, such as pigments responding in the visible or infrared, or phosphorescent or anti-UV pigments, etc.) that binds the fibers and makes the veil stiff enough for it to be handled easily. This binder, which conventionally comprises at least one polymer (examples given below) that is able to bind the fibers, is advantageously transparent (it may also comprise a dye, if required) and may be of any suitable type known. Preferably, this binder does not entirely cover the surface of the fibers such that a light ray passing through the extraction layer meets interfaces between the fibers and the binder or another medium, especially encapsulating the fibers, as explained below. The binder preferably represents from about 5 to 30 wt % of the veil (especially for a glass veil) or more preferably from 5 to 20%. The expression "encapsulating the fibers" is understood to mean coating/covering/embedding at least a part of the fibers. Therefore interfaces exist between the material of the fibers and that of the encapsulating medium.

The fibrous structure may also optionally be formed by fibers deposited, for example, on a medium (especially a polymer matrix) forming an encapsulating medium, in such a way that they intermingle to form a veil, this veil then having no binder other than the encapsulating medium.

Generally, the fibrous structure may thus be associated with or embedded in a binder and/or encapsulating medium especially in order to allow it to be handled and to protect the fibers. The fibrous structure and, where appropriate, its binder or encapsulating medium form a (semi)transparent assembly. In order to favour scattering and extraction, the absolute value of the difference between the refractive index of the fibers of the fibrous structure and the refractive index of the encapsulating medium (which may be, where appropriate, the waveguide, as explained below) and/or the refractive index) of the binder where appropriate (when the latter is of sufficient thickness, especially at least about the one of the one or more fibers of the structure) is then preferably higher than or equal to 0.05.

The medium encapsulating the fibers may advantageously be a polymer. In particular, it may be based on polyvinyl butyral (PVB), ethylene vinyl acetate (EVA), polyurethane, an ionomer or adhesive based on a polyolefin or based on one or more transparent thermoplastics such as polyethylene terephthalate (PET), polyethylene naphthalate (PEN), polycarbonate, polymethyl methacrylate, polyamides, polyimides, fluoropolymers such as ethylene tetrafluoroethylene (ETFE) and polytetrafluoroethylene (PTFE), etc. According to a variant, this encapsulating medium may be formed by air or by a liquid having a suitable refractive index, instead of a polymer matrix.

The encapsulating medium, which incorporates the fibers where appropriate, is also advantageously located in the core of the waveguide element. It may be made of an identical or different material (it may also be the waveguide itself), or may have a refractive index that is identical or different to that of the waveguide. Generally, the encapsulating medium is a polymer matrix, especially formed by the waveguide, a polymer lamination interlayer, or a thermoplastic substrate. Preferably, the medium encapsulating the fibers is formed from the same material as the one of the one or more waveguides or is the waveguide itself. The encapsulating medium generally has a thickness larger than or equal to the thickness of the fibrous structure. In the case where the encapsulating medium is different from the waveguide, the fibrous structure with its encapsulating medium (this assembly, where appropriate, forming the extraction means) advantageously has a thickness smaller than or equal to that of the waveguide, the waveguide possibly extending beyond the fibrous structure (and, where appropriate, of its encapsulating medium) on one side or two sides.

The extraction properties of the fibrous layer may be adjusted by varying one or more parameters among, especially, the weight per unit area of the fibrous structure, the diameter of the fibers, the length of the fibers, the composition of the fibers and (where appropriate) the composition of the encapsulating medium. A woven may be used when a highly periodic and uniform structure is desired. Advantageously, the extraction layer has a total light transmission of 80% or more, the total light transmission, comprising direct light transmission and scattered light transmission, being defined according to ISO standard 9050:2003 as indicated above. If required, the extraction layer also especially has a haze value of 40% or more, the haze value of an element, expressed as a percentage, representing the ability of this element to scatter light, the haze values being measured in this case using a hazemeter according to ASTM standard D1003.

The fibrous structure used according to the invention (with, where appropriate, its binder and/or encapsulating medium when it is different from the waveguide) may be inserted between two waveguide elements (or elements parts) or on the edge of a waveguide element or inside a waveguide element, the assembly then being laminated with the other elements of the glazing unit. In particular, the fibrous structure may be deposited on the plastic sheet intended to form the waveguide, which may be larger than the envisioned laminated unit (especially in order to allow light to be injected more easily into the waveguide), the assembly then being heated until the plastic softens so that the fibers penetrate into the polymer, the assembly then simply being laminated, using a conventional lamination process, between two glass sheets (or at least two glazing elements) and one or more lamination interlayers. Alternatively, the fibrous structure may be inserted into a mould before the polymer intended to form the waveguide is injected in order to form a layer comprising (a) waveguide(s) and (a) fibrous layer(s), or the fibrous structure may be placed intermediate between two waveguide parts or on the edge face of a waveguide before lamination between glass sheets and if required lamination interlayers.

The extraction means may comprise one or more joined or separate fibrous layers (and possibly at least one binder and/or at least one encapsulating medium especially other than the waveguide). Thus, since the one or more fibrous layers are arranged in the thickness of the waveguide they are protected, and the external faces of the glazing unit in contact with the external environment may then be smooth and easily cleaned. The extraction means may also comprise a first fibrous layer (scattering in the visible and/or UV) and a second layer, for example an external layer, based on particles that scatter in the visible and/or phosphors excited by UV light and emitting in the visible. Additional extraction means may, if required, be provided, for example an extraction face of the glass may also be frosted, sandblasted, screen printed, etc. or the thickness of the guide may also be etched, etc.

The one or more fibrous layers used as the extraction means may cover one or more limited or relatively large zones (or parts) of the area of the glazing unit depending on the illumination or effect desired (they may take the form of strips located on the periphery in order to form a luminous frame, or form logos or patterns, etc.). To provide even more uniform illumination, the fractional area covered by the fibers may increase with distance from the light source, for example being 5% near the source and 16% to 55% far from the source.

As already mentioned, the extraction means may be in a number of pieces, for example forming identical or different, continuous or discontinuous patterns, possibly of any geometrical shape (rectangle, square, triangle, circle, oval, etc.) and/or may form a graphic or a symbol (arrow, letter, etc.). It is easy to define zones that can be checked for quality and reproduced industrially. The glazing unit may thus comprise a number of extraction zones (fibrous layers) in order to form a number of luminous zones on the glazing unit. As mentioned above, the one or more luminous zones may cover all or part of the (functional, visible) surface of the glazing unit. A number of zones may therefore emit light whether simultaneously or not or whether they are controlled independently or not. The glazing unit may provide differentiated illumination, for example producing both architectural and decorative illumination, or architectural illumination and a sign or architectural illumination and a display (for example a graphic, logo, alphanumeric symbol, etc.) or a reading light, etc. A range of colors may furthermore be obtained by way of the light sources (in particular LEDs) but also by dyeing the fibers of the fibrous structure.

Preferably, most, or even at least 80% or 90%, of the light (in particular the light reaching the fibrous layer zone) is extracted by the fibrous layer. The advantage of distributing the fibers discretely or randomly is that the guide appears transparent when the light source is turned off and can be clearly seen through (it is possible to recognize and identify forms such as faces and symbols), this being particularly advantageous in automotive applications.

In one embodiment, when the light source is turned off, the glazing unit appears transparent or largely (due to the mesh of the fibers) transparent, especially having a light transmission $T_L$ of more than 20%, preferably 50% or more, or even 70% or more, and having a light reflection $R_L$ of 50% or less, preferably 30% or less (in the case, for example, of an illuminating window, the improved illumination of the room not being achieved to the detriment of light transmission).

In another embodiment, when the light source is turned off, the glazing unit may be semireflective or reflective or form a mirror (by means of a mirror fastened to one of the faces of the substrate or a metal sheet or plate made of stainless steel, for example, or a metal film, especially a silver film, located on one of the faces of the substrate (generally opposite the luminous/extraction face)), the glazing unit also possibly forming a mirror when the source is turned on.

One or more other zones may indeed also be present on one and/or other of the glazing-unit elements, for example: a (semi)transparent zone and/or a reflective zone forming a mirror (produced by depositing a reflective coating), with, if required, an additional scattering means formed by etching the mirror; and/or a translucent or mat zone (protection of privacy, etc.) obtained for example by texturing a glazing element; and/or a zone decorated with an opaque and/or colored coating or with a glazing element tinted through its thickness, etc.

The glazing unit according to the present invention meets industrial requirements (in terms of yield, cost, rate, automation, etc.), thus allowing "low cost" production of the unit without sacrificing performance. It may be used both externally and internally.

In one simple embodiment, the glazing unit may, for example, comprise a laminated structure composed of an external sheet (intended to be illuminated), a transparent central light-guiding sheet (waveguide sheet such as described according to the invention) incorporating an internal layer of fibers, and another external sheet. The light source is a plurality of light-emitting diodes mounted on a lateral support fixed to the edge face of the sheets of the laminated unit, a recess being provided, if required, in the central sheet to house the diodes.

Apart from the elements already mentioned, the glazing unit may also comprise other elements and/or layers, for example a light reflector (a part, fixed if required in the internal space, with a reflective surface, the central rays being reflected toward a face by virtue of the reflector, thereby ensuring, if required, higher optical efficiency and/or this reflector recycling light backscattered by scattering means and/or reflected onto the one or more diode backings and/or reflected onto a spacer). The glazing unit may also comprise one or more transparent adhesive resins (for adhesively bonding elements, for example a layer forming an external adhesive, especially a layer made of a material that becomes adhesive on being softened by heating (PVB for example) or made of a material with adhesive sides, such as PE, PU, PET), protective layer (sheet, film, deposit, etc.) (for example a flexible PU, PE or silicone layer, possibly bonded using acrylic) on the border of one face or extending over said face, a layer (if required an electrically conductive layer) with one or more functions such as: radiation protection (IR, UV); solar control; low-E; scratch resistance; an esthetic (color, patterns, etc.) function, etc. The glazing unit according to the invention has the advantage of being compatible with the use of other layers, this being particularly advantageous in the case of automotive applications.

It may thus be advantageous to incorporate, in the glazing unit or on one of its elements, a coating having a given function, for example an infrared blocker (for example based on silver films flanked by dielectric films, or nitride films, such as TiN or ZrN films, or metal-oxide or steel films or films made of an Ni—Cr alloy) or a low-E coating (for example made of a doped metal oxide such as $SnO_2$:F or indium tin oxide (ITO) or one or more silver films), or an antifog coating (hydrophilic film), or an antifouling coating (photocatalytic coating comprising $TiO_2$ at least partially crystallized in the anatase form), or even an antireflection multilayer coating, (for example $Si_3N_4/SiO_2/Si_3N_4/SiO_2$), a hydrophobic/oleophobic layer or oleophilic film, a multilayer for reflecting thermal (solar control) or infrared (low-E) radiation, etc. The module may thus incorporate any functionality known in the glazing field.

It is also possible to texture surfaces, especially by sandblasting, acid etching or screen printing, for functional or esthetic reasons (for example to prevent dazzle), etc.

The glazing unit according to the invention may be used to produce decorative illumination, light for reading, architectural illumination, a sign, a display, etc. It may for example be:

- advantageously intended for automotive or transport vehicles and used as a luminous glazed roof or a luminous window (rear window, side window, windshield), as a luminous glass door, especially in public transportation (trains, subways, trams, buses), or in waterborne or airborne (airplane) transportation, or for highway or urban lighting;
- intended to form architectural glazing, such as an illuminating (or luminous) wall panel, an illuminating window, a ceiling, a luminous floor or wall tile, a luminous glass door, a luminous partition or a staircase step;
- intended for urban furniture, such as a luminous glass part for a bus shelter, balustrade, display case, store window, shelf element, greenhouse, jewelry display, aquarium, railing, step riser, a plinth;
- intended for interior furnishings, such as a luminous bathroom wall, a luminous mirror, a luminous glass part of a piece of furniture, a kitchen worktop, a splashback, a back panel for a cooker hood, floor or wall tiling, a refrigerator element (shelf); or
- intended for any domestic or professional refrigerating, freezing or cooking appliance (such as glass-ceramic plates), etc.

It is also possible to use the glazing units as planar lamps, these planar lamps possibly being back lights employed in flatscreen computer monitors to illuminate liquid crystal displays, or being used in ceilings, flooring or walls, or being lamps for billboards or lamps possibly forming store window shelves or backdrops, etc. The expression "planar lamp" is generally used when the glazing unit consists of two substantially planar substrates, such as glass sheets, on which various layers, forming the lamp, are deposited (for example silver electrodes covered with a dielectric, aluminum and phosphor films, etc.).

The illumination/extraction may be adjusted to obtain ambient lighting, light for reading, a luminous sign, nighttime illumination or illumination of displayed information of any type, i.e. graphics, logos, alphanumeric symbols or other symbols, and may also be remotely activated (detection of the vehicle in a parking lot or elsewhere, indication of (un)locking doors), a safety sign, etc. The light may be continuous and/or intermittent, monochromatic and/or polychromatic, white, etc.

The glazing unit provides illumination of good uniformity and has a satisfactory extraction efficiency. Insertion of the textile defines zones that can be easily controlled for quality and reproduced industrially and makes the extraction easier to control, the reliability of the diodes also being advantageous in intensive-use applications. As already mentioned, the use of the fibrous structure as an extraction area in automotive glazing applications is furthermore compatible with the use of thin films on the glass and with production lines without screen-printing capability, it also allows a rendition and an appearance that cannot be obtained with other extraction means and is compatible with the requirements of glazing units having smooth external surfaces. It furthermore reinforces the glazing if it is used over a large area.

The invention also relates to a vehicle incorporating (or comprising) the glazing unit defined above.

Lastly, the invention relates to a process for manufacturing a glazing unit such as defined above, comprising adding at least one fibrous structure (forming a/the extraction means) in the core of at least one waveguide element and laminating the assembly between at least two glazing elements and optionally a lamination interlayer, said waveguide element having a refractive index higher than the refractive index of the adjacent interlayer(s) and/or glazing element(s) between which it is laminated.

As indicated above, the fibrous structure may in particular be encapsulated (in a prior step) in the waveguide element (or in a polymer/plastic encapsulating layer or sheet), the fibrous structure possibly being encapsulated during moulding of the layer in question by positioning the fibrous structure in a mould then injecting the polymer (in particular a thermoplastic, for example polycarbonate in the case of the waveguide) into the mould. Alternatively, once prepared, the fibrous layer may be embedded into the (plastic) sheet/layer in question by pressing the fibrous layer against the plastic sheet or (the assembly formed by) the fibrous layer deposited on the plastic sheet may be heated until the plastic softens allowing the fibers to penetrate into the polymer. Alternatively also, the fibrous structure (and where appropriate its binder and/or encapsulating medium) may also be added (positioned, adhesively bonded/glued, etc.) between two waveguide parts or on the edge face of a waveguide. The assembly formed by each fibrous structure (and, where appropriate, its encapsulating medium) and the one or more associated waveguides is then introduced into the glazing unit, in the same way as for a conventional lamination interlayer, and this laminated structure is preferably passed through an oven (for example at temperatures of about 120° C. and under pressure) in order to obtain a good cohesion between the various constituent layers of the glazing unit.

In the case where a glass-fiber veil is used, this veil may be formed using a "dry" process or a "wet" process. Such processes for manufacturing glass-fiber veils are well known to those skilled in the art, and they are not described here in greater detail.

The present invention will be better understood and other details and advantageous features of the invention will become clear on reading about exemplary luminous glazing units according to the invention, illustrated by the following figures.

It will be noted that for the sake of clarity the various elements of the objects shown have not necessarily been drawn to scale. Elements of the same type have been given the same reference numbers in the various figures.

Figure 1:
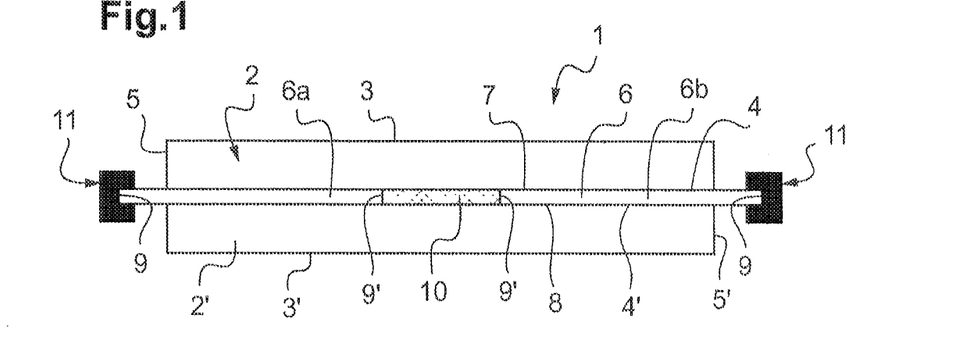
FIG. 1 shows a schematic cross-sectional view of a glazing unit according to a first embodiment of the invention.

In FIG. 1, the glazing unit according to the invention is a laminated glazing unit 1 comprising:

a first transparent sheet 2, for example a rectangular sheet (300 mm×300 mm in area for example) made of mineral glass, having a first main face 3 and a second main face 4 and an edge face 5 that is preferably rounded (to avoid flaking), for example a sheet of Planilux® soda-lime-silica glass (sold by Saint-Gobain Glass) having a thickness of 2.1 mm, for example, and a refractive index of 1.51;

a second glass sheet 2' having the same composition and dimensions as the first sheet, or optionally having a tinted composition providing a solar control function (Venus® VG10 or TSA 4+ glass sold by Saint-Gobain Glass, for example) and/or covered with a solar control coating, having a refractive index of 1.51, with a main face 4' opposite the face 4, and another Main face 3' and an edge face 5'; and a polycarbonate sheet 6 (having a refractive index of about 1.59) forming a waveguide element, this sheet being larger in size than the other elements of the laminated unit and having a first main face 7 and a second main face 8 and an edge face 9, said sheet incorporating in its core/body a fibrous structure 10 having a refractive index of 1.57, and bearing, on each of its two lateral ends protruding from the laminated unit, one or more light sources 11 formed by light-emitting diodes.

The glass sheets of the glazing unit preferably have a linear absorption coefficient of 2.5 $m^{-1}$ or less in the visible (for example they are made of extra-clear soda-lime glass having a linear absorption coefficient lower than 0.7 $m^{-1}$ in the visible or near UV).

The strip supporting the light-emitting diodes 11 lies bordering the glazing unit and is fixed to the waveguide sheet (comprising, if required, a notch) on the edge face 9 (the emitting face of the sources facing the edge face and an adhesive being deposited, if required, on the chips in order to seal them during encapsulation). This support may be a single piece of metal (stainless steel, aluminum) or for example made of thin layers of polyimide, 0.2 mm in thickness. The diodes of each group each have a given main emission direction substantially parallel to the first face, for example equidistant from the first and third faces. By way of example, the (about twenty) diodes each have a power of (about) 0.4 W and lie over a length L0 of 450 mm, giving a power of 20.5 W/m.

The light is guided in the thickness of the waveguide (or, where appropriate, of the parts of the waveguide or in each of the waveguides) by reflection and is extracted from the first face 3 by means of the fibrous layer 10. The fibrous layer is advantageously a transparent veil of E (-type)-glass fibers. An exemplary glass-fiber veil that may be used is the U50 veil, sold by Saint-Gobain Technical Fabrics, which has a mass per unit area of 50 g/m².

Figure 3A:
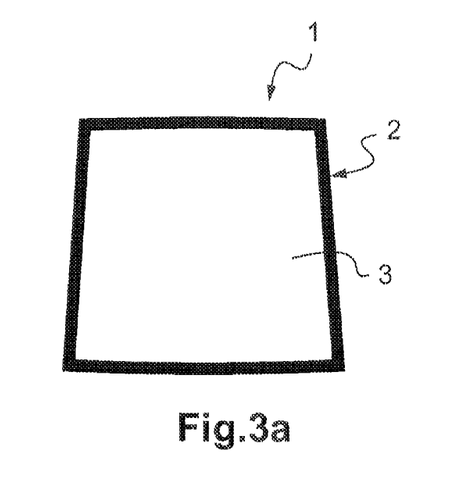
FIGS. 3a and 3b respectively show schematic front views of a glazing unit according to one embodiment of the invention.
Figure 3B:
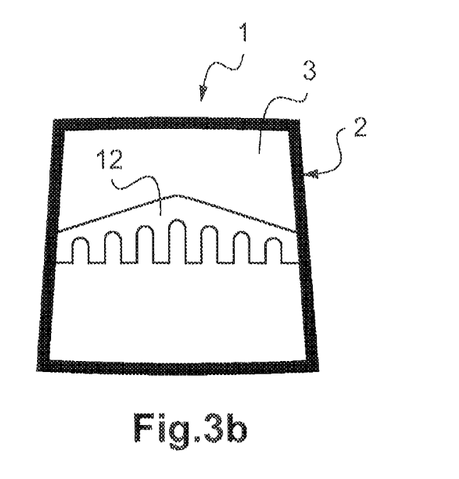

The glazing unit in FIG. 1 may for example form a terrestrial vehicle fixed panoramic roof, mounted from the outside, the first sheet being on the inside of the vehicle, and extraction preferably occurring via the face 3 (oriented for example toward the passenger compartment of a vehicle). When the diodes are turned off, the luminous glazing unit is largely transparent (FIG. 3*a*), having an overall light transmission $T_L$ of about 85% and a light reflection $R_L$ of about 15%. When the diodes are turned on, the extracted light may form a luminous graphic 12 (with, where appropriate, a fibrous aesthetic appearance) for example a logo or a trademark, as shown in FIG. 3*b*, the veil having for this purpose the shape of the desired pattern in order to create the desired symbol.

The fibrous structure forming the extracting means is here inserted (for example hot as seen above) into the thickness of the waveguide sheet 6 in the desired location in order to form a luminous zone, and its thickness does not exceed that of the waveguide sheet (this fibrous structure is used alone or with a binder or where appropriate is already encapsulated or embedded in polycarbonate or another polymer, the absolute value of the difference between the refractive index of the fibers of the fibrous structure and the refractive index of the binder and/or the encapsulating medium being, where appropriate, greater than or equal to 0.05). The veil, and where appropriate, its initial coating material (binder, encapsulating medium), forming the extraction means, may be encapsulated in part only of the thickness of the waveguide or may be of the same thickness. The refractive index difference between the fibers of the veil and the encapsulating matrix (guide or other intermediate medium) contributes to the extraction of the light at the interface between the fibers of the veil and the matrix. The extraction, which is influenced by both the veil and the good light transmission of the layer at rest, may be adjusted by varying one or more parameters among, especially, the weight per unit area of the veil, the diameter of the fibers of the veil, the composition of the fibers of the veil, and the composition of the polymer matrix, in order to obtain a layer providing an advantageous compromise between haze and light transmission.

As a variant, the glazing unit may also comprise a plurality of waveguide portions or a plurality of separate waveguides 6*a*, 6*b*, at the intersection of which (or on the edge face 9' opposite the edge face receiving the sources, of which) the fibrous structure 10 is located, these waveguides or waveguide portions especially being located in the same plane (and in the same plane as the fibrous structure). The glazing unit may also, as a variant, possess a plurality of illuminated zones, the luminous zone(s) for example occupying at least 50%, even 80% of the area of at least one face, being of a given geometry (rectangular, square, round, etc.) and/or regularly distributed in order to produce a decorative illumination. Generally, the glazing unit advantageously has a single illuminating face 3, forming a luminaire for example. It is also possible to place a mirror opposite the back glass pane. The glazing unit may thus serve as a mirror (especially when the glazing unit is intended for architectural applications) during the day and as a light source at night.

Figure 2:
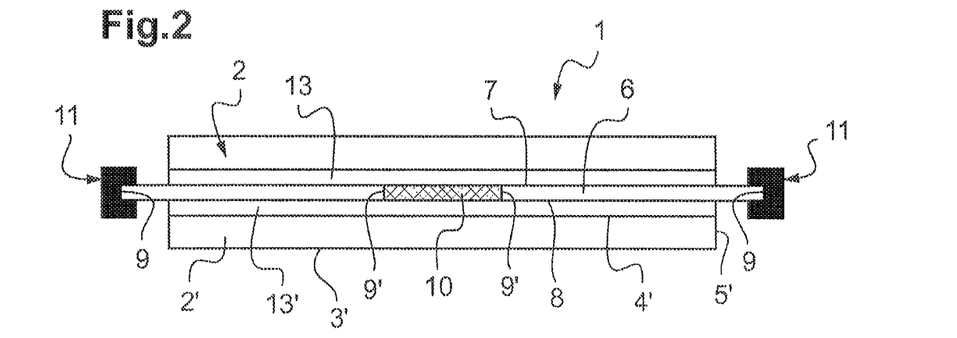
FIG. 2 shows a schematic cross-sectional view of a glazing unit according to a second embodiment of the invention.

The glazing unit in FIG. 2 differs from the preceding unit by the following technical features: the glass sheet 2 is laminated with the glass sheet 2' (which is optionally of a different size or shape) by means of two lamination interlayers (or interlayer parts) 13, 13', such as preferably (extra) clear PVB layers (or one layer may be clear and the other one tinted), each of these layers, for example, being 0.38 mm in thickness, these interlayers furthermore having a refractive index of 1.48, the waveguide 6 and the fibrous structure 10 being located between them.

The glazing unit according to the invention may be used in many applications, in particular in automotive applications (generally in the form of a laminated or monolithic glazing unit) but also possibly in both interior and exterior architectural applications (in particular in the form of an insulating multiple glazing unit, for example for illuminating building façades, etc.), in planar lamps, etc.

The invention claimed is:

1. A luminous glazing unit comprising:
   at least two glazing elements;
   optionally at least one lamination interlayer between the two glazing elements;
   at least one waveguide element, said waveguide element having a refractive index higher than the refractive index of the adjacent elements;
   at least one light source provide light for illuminating the waveguide element; and
   at least one light extraction means, formed by at least one fibrous structure, said fibrous structure being placed in the core of the waveguide element so that at least part of said fibrous structure is arranged in a central zone of a thickness of the waveguide element.

2. The luminous glazing unit as claimed in claim 1, wherein the fibrous structure is positioned in the thickness of the waveguide element or between two waveguide elements or waveguide elements parts, or on the edge face of the waveguide element.

3. The luminous glazing unit as claimed in claim 2, wherein the at least one fibrous structure is positioned on a part opposite an edge or one of the edges of the glazing unit receiving the at least one light source.

4. The luminous glazing unit as claimed in claim 1, wherein the fibrous structure comprises fibers running in at least two different directions.

5. The luminous glazing unit as claimed in claim 4, wherein the at least one fibrous structure comprises intertwining or intermixed fibers.

6. The luminous glazing unit as claimed in claim 5, wherein the at least one fibrous comprises fibers in the form of nonwoven, woven or knitted structure.

7. The luminous glazing unit as claimed in claim 6, wherein the at least one fibrous structure is, or is formed from, at least one veil of fibers.

8. The luminous glazing unit as claimed in claim 1, wherein the difference between the refractive index of the waveguide element and the refractive index of each of the adjacent elements is at least 0.05.

9. The luminous glazing unit as claimed in claim 8, wherein the difference is at least 0.1.

10. The luminous glazing unit as claimed in claim 9, wherein the difference is at least 0.2.

11. The luminous glazing unit as claimed in claim 1, wherein the waveguide element is made of polycarbonate or polystyrene.

12. The luminous glazing unit as claimed in claim 1, wherein the extraction means also comprises at least one binder and/or fiber-encapsulating medium, the absolute value of the difference between the refractive index of the fibers of the fibrous structure and the refractive index of the binder and/or encapsulating medium being greater than or equal to 0.05.

13. A process for manufacturing a luminous glazing unit as claimed in claim 1, comprising adding at least one fibrous structure in the core of at least one waveguide element to form an assembly and laminating the assembly between at least two glazing elements and optionally a lamination interlayer, said waveguide element having a refractive index higher than the refractive index of the adjacent elements.

14. The process as claimed in claim 13, wherein the fibrous structure is deposited on a plastic sheet intended to form the waveguide, then the assembly is heated until the plastic softens so that the fibers penetrate into the sheet, or the fibers are embedded in the sheet by pressing the fibrous structure against the sheet, the assembly then being laminated between at least two glazing elements and optionally one or more laminating interlayers, the laminated unit obtained optionally being passed through an oven.

15. The process as claimed in claim 13, wherein the fibrous structure is positioned in a mould before the polymer intended to form the waveguide element is injected in order to form the layer comprising the waveguide(s) and the fibrous structure(s), the assembly then being laminated between at least two glazing elements and optionally one or more lamination interlayers, the laminated unit obtained optionally being passed through an oven.

16. The process as claimed in claim 13, wherein the fibrous structure, with when appropriate its binder and/or encapsulating medium, is placed between two waveguide parts or on the edge face of the waveguide before the assembly is laminated between at least two glazing elements and optionally one or more lamination interlayers.

17. An automotive vehicle incorporating a luminous glazing unit as claimed in claim 1.

18. The application of the glazing unit as claimed in claim 1 in a means of transportation, as an architectural glazing unit, as a glazing unit in an item of furniture, or as a planar lamp.

19. The luminous glazing unit as claimed in claim 1, wherein the at least two glazing elements include two transparent glass sheets.

20. The luminous glazing unit as claimed in claim 1, wherein the at least one light source is positioned at an edge of the glazing unit to illuminate the waveguide element via the edge face of the waveguide element.

21. The luminous glazing unit as claimed in claim 1, wherein the at least one fibrous structure is in the form of a textile.

22. The luminous glazing unit as claimed in claim 1, wherein the at least one fibrous structure has a thickness smaller than or equal to that of the at least one waveguide element.

23. The luminous glazing unit as claimed in claim 1, wherein the waveguide element is located on one face of the lamination interlayer and/or between the two glazing elements.

* * * * *